United States Patent
Bourgeois et al.

(10) Patent No.: US 6,701,039 B2
(45) Date of Patent: Mar. 2, 2004

(54) SWITCHING DEVICE, IN PARTICULAR FOR OPTICAL APPLICATIONS

(75) Inventors: Claude Bourgeois, Bôle (CH); Carsten Underbjerg, Arhus (DK)

(73) Assignee: Colibrys S.A., Neuchatel (CH)

( * ) Notice: Subject to any disclaimer, the term of this patent is extended or adjusted under 35 U.S.C. 154(b) by 0 days.

(21) Appl. No.: 10/260,541

(22) Filed: Oct. 1, 2002

(65) Prior Publication Data

US 2003/0068118 A1 Apr. 10, 2003

(30) Foreign Application Priority Data

Oct. 4, 2001 (EP) .......................................... 01203749
Oct. 4, 2001 (EP) .......................................... 01203752

(51) Int. Cl.$^7$ ................................................. G02B 6/35
(52) U.S. Cl. ............................. 385/22; 385/16; 385/18
(58) Field of Search ..................................... 385/16–23

(56) References Cited

U.S. PATENT DOCUMENTS

| | | | | | |
|---|---|---|---|---|---|
| 5,367,585 A | * | 11/1994 | Ghezzo et al. | ................. | 385/23 |
| 6,396,975 B1 | * | 5/2002 | Wood et al. | ................... | 385/18 |
| 6,396,976 B1 | * | 5/2002 | Little et al. | ..................... | 385/18 |
| 6,577,785 B1 | * | 6/2003 | Spahn et al. | .................. | 385/22 |
| 6,587,612 B1 | * | 7/2003 | Mitchell et al. | ............... | 385/18 |
| 6,597,048 B1 | * | 7/2003 | Kan | ............................ | 257/415 |
| 2002/0181855 A1 | * | 12/2002 | Xue et al. | ...................... | 385/23 |
| 2003/0012488 A1 | * | 1/2003 | Staple et al. | .................. | 385/18 |

* cited by examiner

Primary Examiner—John D. Lee
(74) Attorney, Agent, or Firm—Sughrue Mion, PLLC

(57) ABSTRACT

There is described a switching device comprising a mobile element (2) that is able to at least move back and forth along a defined trajectory between a zero position (O) and at least one predetermined switching position (A, B), an elastic member (3, 30, 32) connecting the mobile element to a base (4) and at least one stationary actuating electrode (5, 6) located in the vicinity of the predetermined switching position for producing electrostatic forces to cause the mobile element to move to and/or away from the predetermined switching position.

The stationary actuating electrode is disposed to act on at least one edge (20a) of the mobile element which is substantially parallel to the mobile element's trajectory. The geometry of the mobile element, elastic member and actuating electrode is such that the mobile element cannot come into contact with the actuating electrode and that the switching position is defined by an equilibrium point (E) between lateral electrostatic forces produced on the mobile element by the stationary actuating electrode and mechanical springs forces produced by the elastic member.

21 Claims, 12 Drawing Sheets

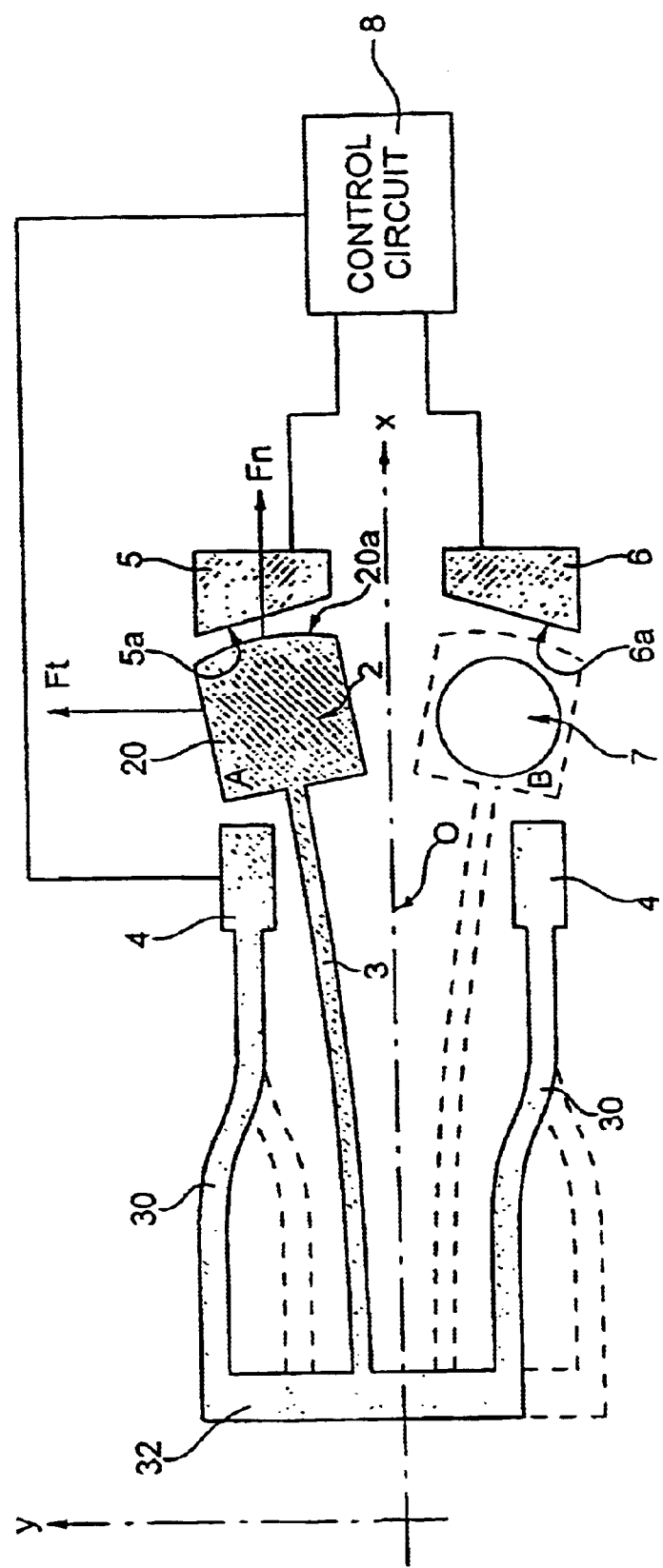

Fig. 4a
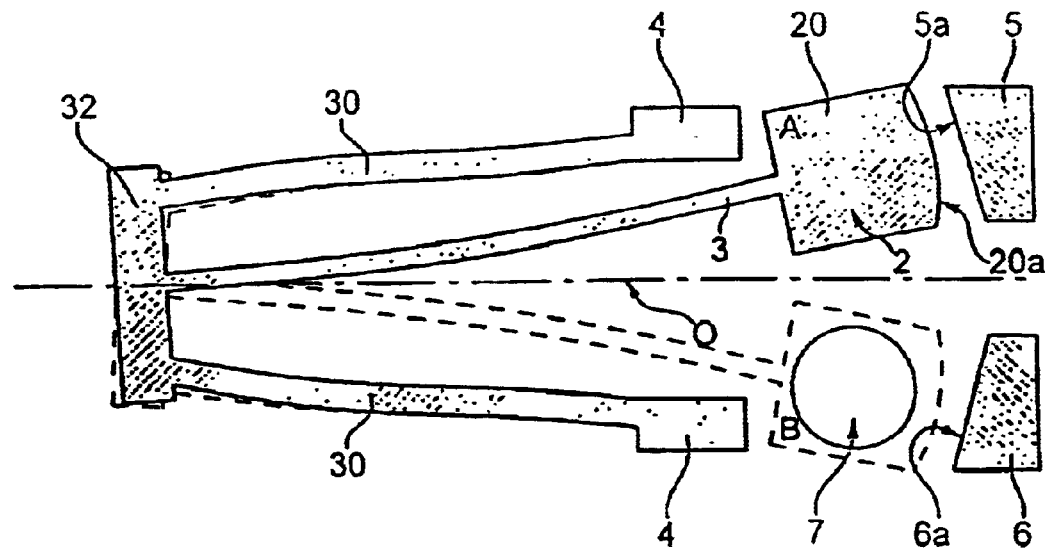
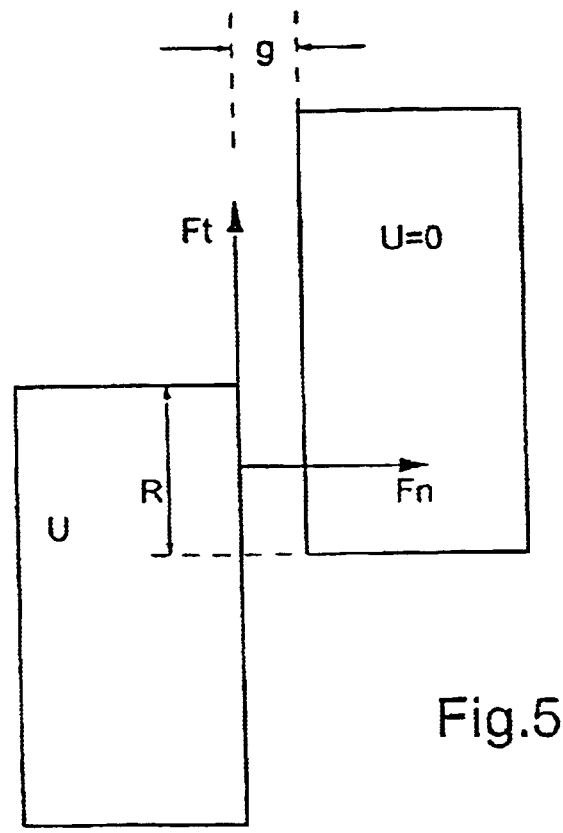
Fig.5

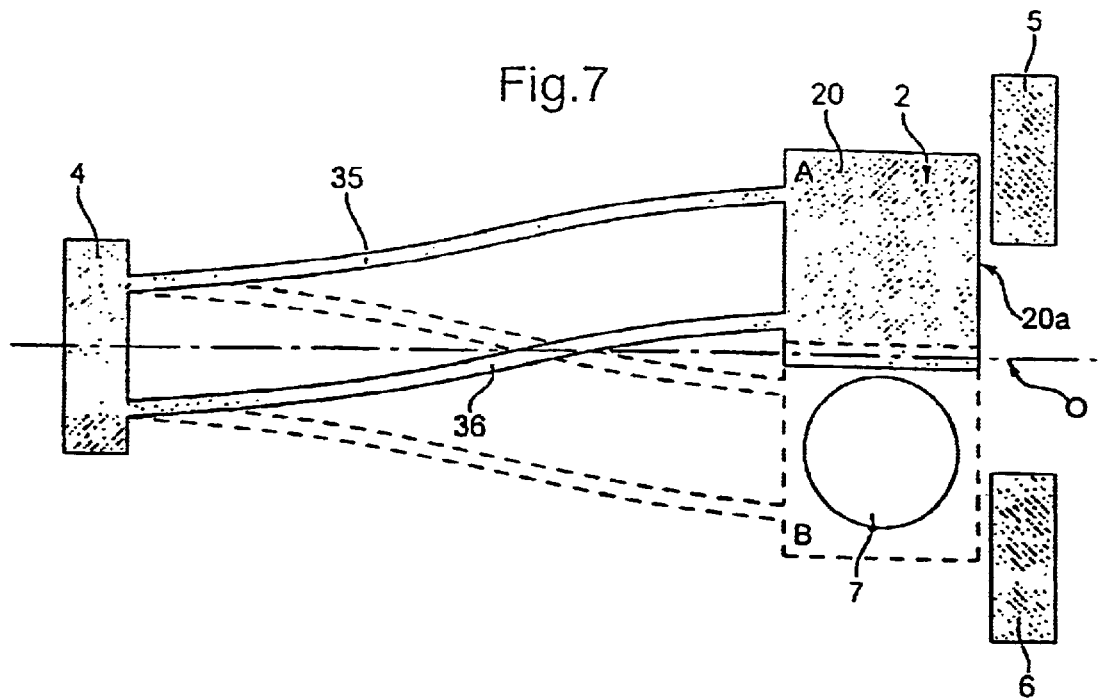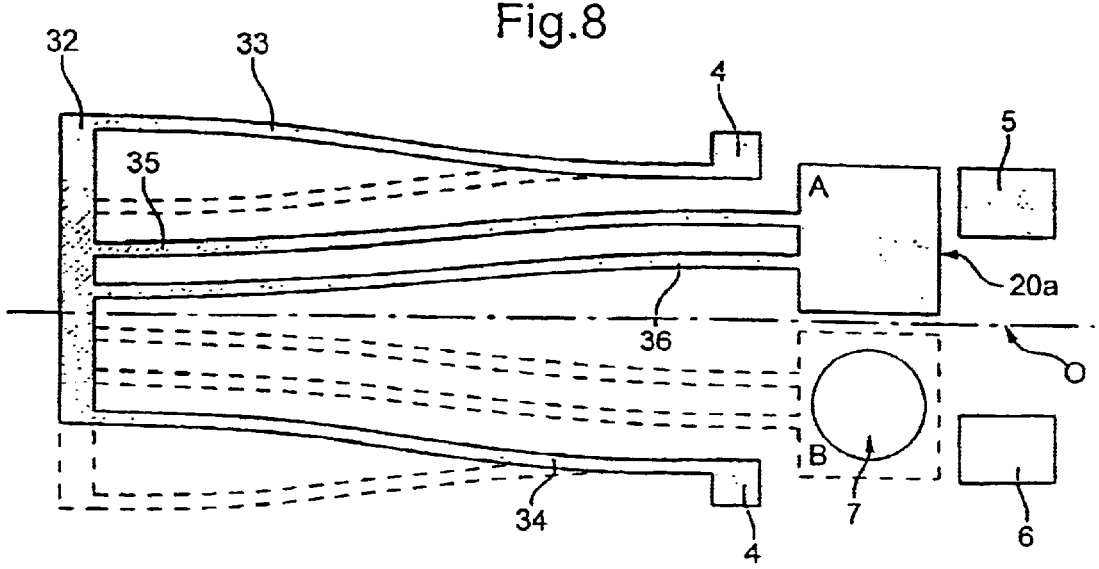

SWITCHING DEVICE, IN PARTICULAR FOR OPTICAL APPLICATIONS

The present invention generally relates to micro electromechanical systems or so-called MEMS. More particularly, the present invention relates to a switching device comprising a mobile element that is able to move back and forth along a defined trajectory between a zero position and at least one predetermined switching position, an elastic member connecting the mobile element to a base, and at least one stationary actuating electrode located in the vicinity of the said at least one predetermined switching position. The present invention also relates to a method for operating such a switching device and a switching unit that comprises at least one such switching device.

A very wide variety of micromechanical structures that influence or switch, respectively, the paths of optical beams are known. The purpose of such structures is the control, processing, and/or storage of data from pixel-based images.

European Patent Application No. 0 510 629 discloses a deflectable device based on so-called deformable mirror devices, or DMDs, which is also used as a shutter device for selectively interrupting or altering the passage of a light beam. As for other types of DMDs, the device is provided with a controllable screen plate which can either rotate around an axis or move towards the substrate's plane in a piston-like fashion by means of adequate torsion beams, cantilever beams or hinges. Other examples of DMDs may for instance be found in U.S. Pat. No. 4,229,732 and U.S. Pat. No. 5,142,405.

Figure 1:
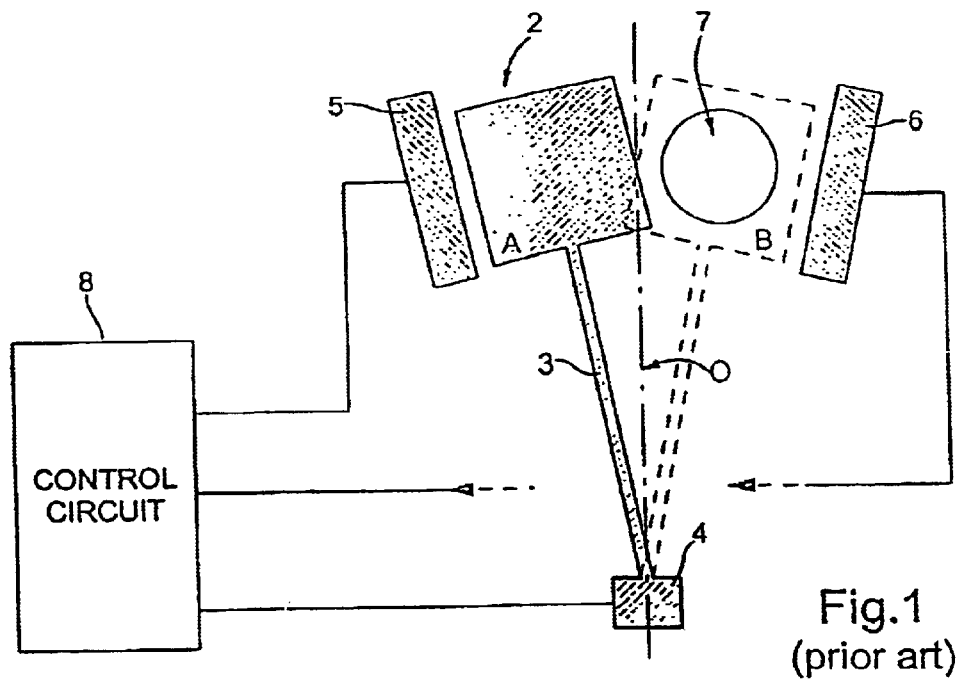

U.S. Pat. No. 5,794,761 discloses a switching device that may be used as a micro-shutter for optical applications. FIG. 1 is a schematic view of this switching device. According to this document, mobile element 2, or swinging element, is able to move between two end positions A and B to selectively interrupt the passage of a light beam through an opening 7 (located in end position B) provided in the substrate of the switching device. Electrodes 5, 6 are placed in the vicinity of end positions A and B. A control circuit 8 is provided to generate electrostatic forces of attraction and/or repulsion for switching the swinging element 2 between the two end positions. The swinging element 2 is attached to the substrate in an elastic manner (for example by means of a flexible beam 3 which is clamped at one of its ends to an anchoring point or base 4). More particularly, according to this document, beam 3 is designed in such a way that an elastic return force which tends towards a zero position O has, in an essential amplitude range, a higher value than the electrostatic force of attraction generated by the control circuit and the electrodes. Accordingly, the characteristics of the switching devices, such as its response time, are mainly determined by the mechanical properties of the structure.

Figure 2:
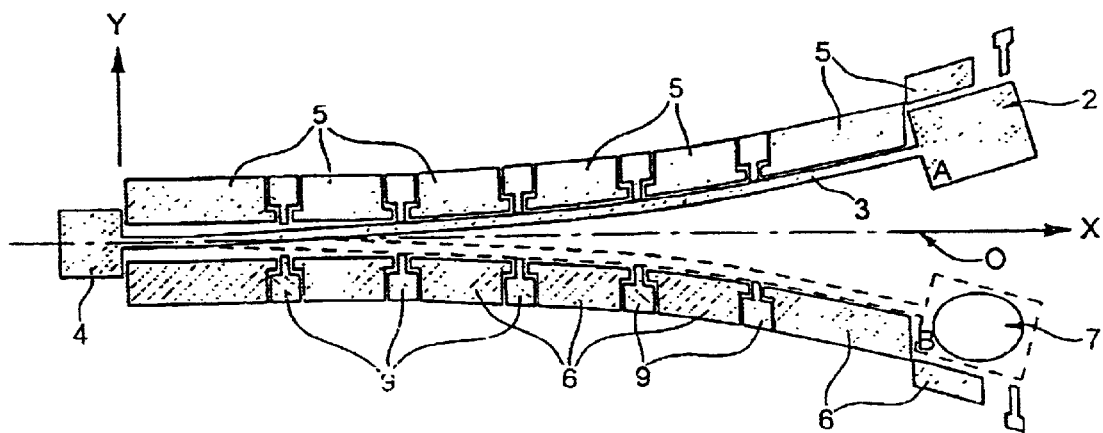

The article "Electrostatic Microshutter Arrays in Polysilicon", G. Perregaux et al., published in "CSEM Scientific and Technical Report 1999", page 99, discloses an improvement of the above-mentioned switching device. FIG. 2 is a schematic view of this other switching device. Electrodes 5, 6 are provided along the whole length of the flexible beam 3 which connects the swinging element 2 to the substrate. Stoppers 9 are further provided on both sides of flexible beam 3 along its length in order to avoid short-circuits between the beam and the electrodes.

Other types of optical micro-shutter devices may be found in U.S. Pat. No. 4,383,255 or U.S. Pat. No. 4,564,836.

According to all of the above prior art solutions, the switching device is actuated by means of attractive forces, i.e. the electrodes are disposed laterally with respect to the mobile element's trajectory so as to produce electrostatic forces which are substantially normal to the cooperating edges of the electrodes and of the swinging element. Stoppers are therefore typically required to limit the displacement of the mobile element as well as prevent any short-circuit between the electrodes and the mobile element.

The contact between the polysilicon surface (or other material) and the stoppers may lead to extensive wear and debris production and can eventually lead to sticking of the mobile element. The so-called "stiction problem" (which also encompasses problems due to capillarity forces or organic and non-organic contamination) Is a well-known and very actual and critical problem with micromechanical switching devices. In the small dimensions, the sticking effect increases with the inverse of the scale down factor, with a preponderance effect due to humidity, surface trapped charges or other proximity forces (such as quantum Van de Walls forces). These sticking forces are in the same order of magnitude than the activation forces (around $0.2 \, \mu N/\mu m^2$). They therefore have significant influence on the reliability of such systems.

In order to overcome this problem, a solution is to conceive structures without stoppers. Without stoppers the control of the displacements of the switching device's mobile element highly depend on the drive level or on an auto-blocking elastic effect such as buckling. Structures using the buckling effect are however very sensitive to technology tolerances and are therefore expensive and complicated to manufacture.

Another solution is to chemically treat the device surfaces and for instance coat the device with an additional layer such as a polymer. This solution however increases the fabrication complexity of the device as well as its costs. In addition, excessive wear of this coating layer can nevertheless give rise to the above stiction problem.

There exists therefore a need for simpler and more reliable solutions to overcome the above-mentioned stiction and short-circuit problems. A principal object of the present invention is thus to provide a solution that is not prone to stiction problems and that is as much as possible independent of the drive and technological tolerances to control the displacements of the mobile element of the switching device.

Another object of the present invention is to provide a solution that is not unnecessarily complicated to manufacture.

A secondary object of the present invention is to provide a switching device that can be arranged in a matrix configuration.

Accordingly, there is provided a switching device the features of which are listed in claim 1.

There is also provided a switching unit comprising a number of such switching device, as well as a method for actuating a switching device the features of which are listed in claim 21.

Other advantageous embodiments of the invention are the object of the dependent claims.

According to the present invention, and in contrast to prior art solutions, the actuating electrodes are not disposed to act laterally on the mobile element so as to produce attractive electrostatic forces but act on a frontal edge of the mobile element (that is an edge which is substantially parallel to the mobile element's trajectory). This driving principle may be called "Edge Electrostatic Drive", that is the movement of the mobile element is not caused by attractive forces generated by the actuating electrodes (as in the prior art solutions), but is rather caused by lateral forces which are substantially parallel to the cooperating frontal edges of the stationary electrodes and of the electrode of the mobile element.

In the scope of the present invention, an attractive electrostatic force shall mean an electrostatic force which tends to bring the cooperating edges of the electrodes nearer (or, conversely, which tends to separate these cooperating edges), whereas a lateral electrostatic force shall mean an electrostatic force which tends to align the cooperating edges of the electrodes one with respect to the other.

According to the present invention, the switching device can truly be designed as a contact-less structure which is not affected by the above-mentioned stiction problems. Indeed, stoppers are not anymore required to define the end positions of the mobile element. As a matter of fact, the mobile element is auto-stabilized in its selected position due to the inversion of the forces resulting from the sum of the lateral electrostatic forces and mechanical spring forces exerted on the device's mobile element.

According to the present invention, the geometry of the device is selected to enhance the contributions of lateral electrostatic forces. Furthermore, In contrast to prior art solutions, the device's switching positions are determined by an equilibrium point between the lateral electrostatic forces produced by the electrodes on the device's mobile element and mechanical spring forces produced by the elastic member that connects the mobile element to the device's base member. The force resulting from the sum of these lateral electrostatic force and mechanical spring force presents an inversion point around this equilibrium point More particularly, according to one embodiment of the invention, the switching device is used as a shutter device for selectively interrupting the passage of a light beam, the switching device being provided with an opening, which is either open or dosed by a screen plate.

According to another embodiment of the invention, the switching device comprises an optical deflecting member disposed perpendicularly to the plane of movement of the switching device. Such device can be used as a shutter or mirror for light beams produced parallel to the switching device's plane.

According to another embodiment of the invention, the switching device is used as a deflectable device and performs the operation of so-called "deformable mirror devices" or DMDs, the switching device being provided with a controllable screen plate comprising a reflective surface, this controllable screen plate being rotated around at least one axis of rotation.

It should be pointed out that the present invention can advantageously be applied in optical application to interrupt, modulate or control the passage of light beams but is however not limited to that particular type of applications.

Figure 3:
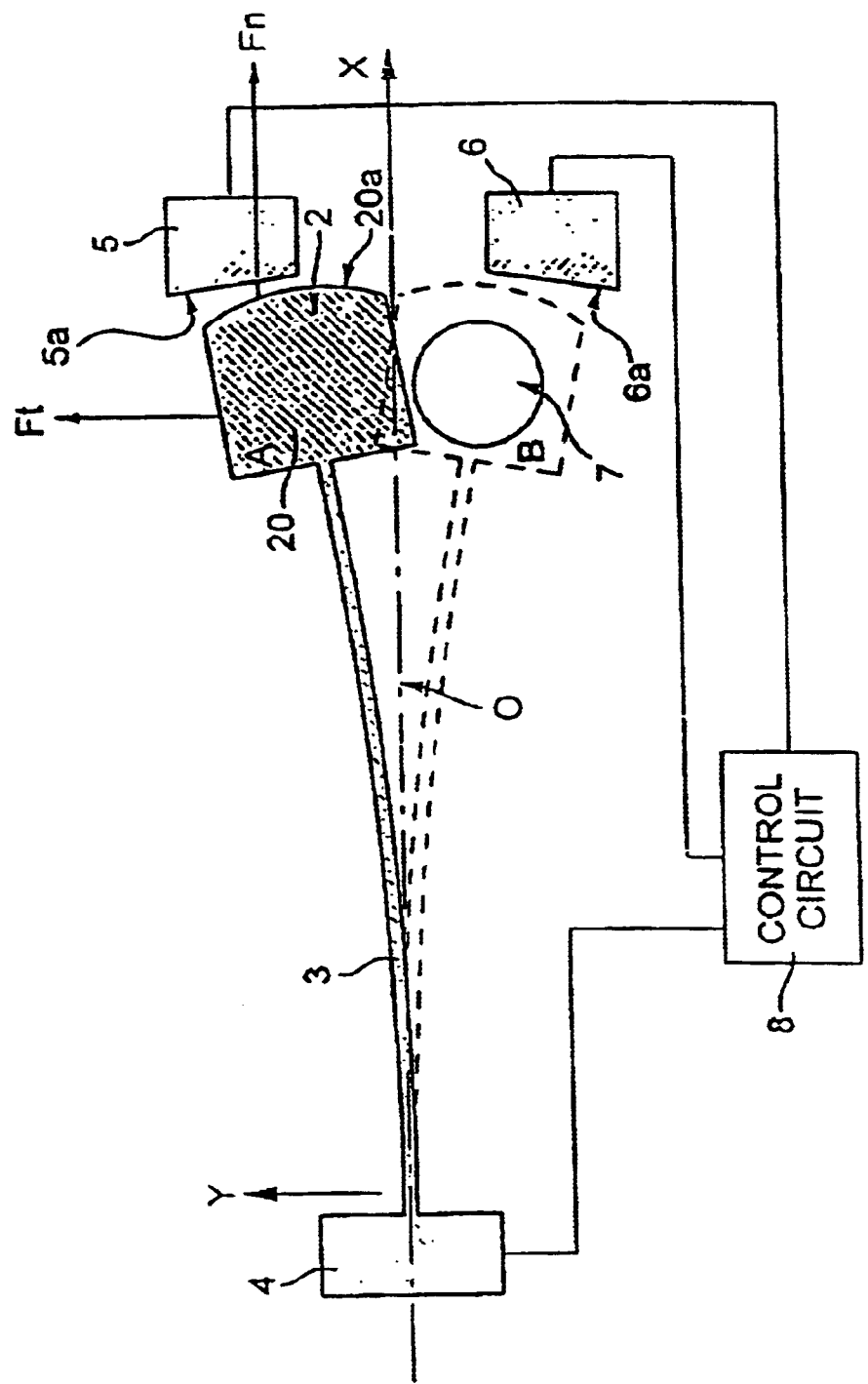
Figure 6:
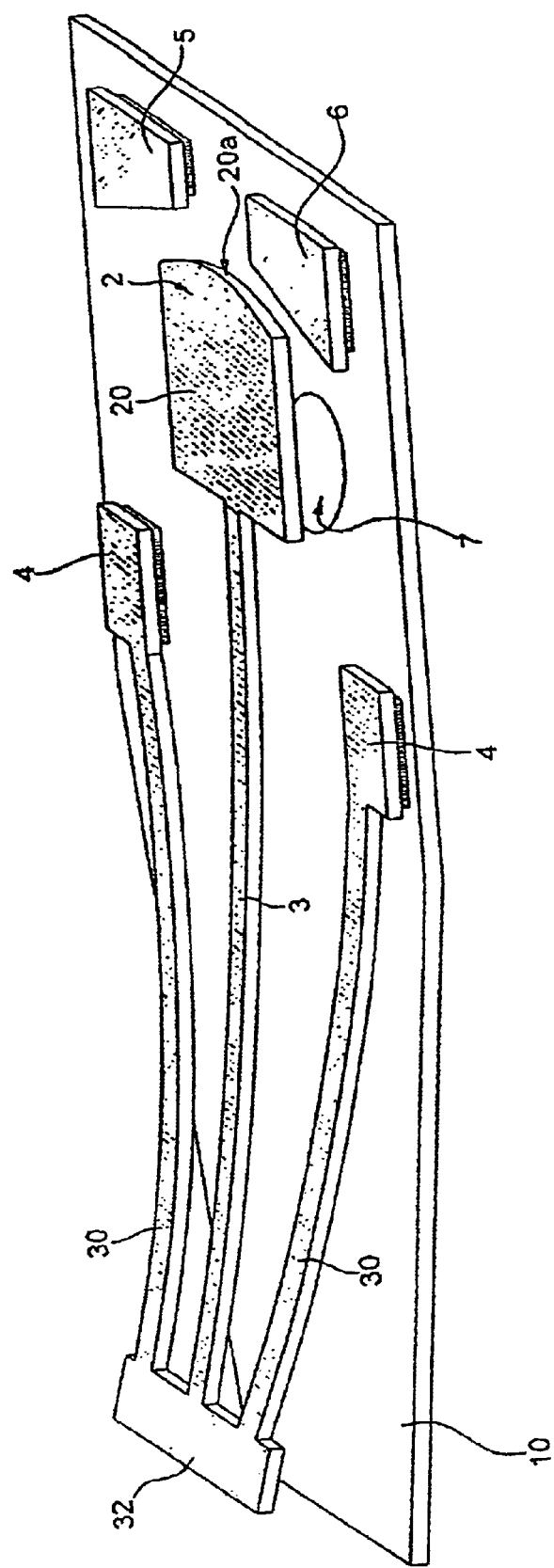
Figure 9:
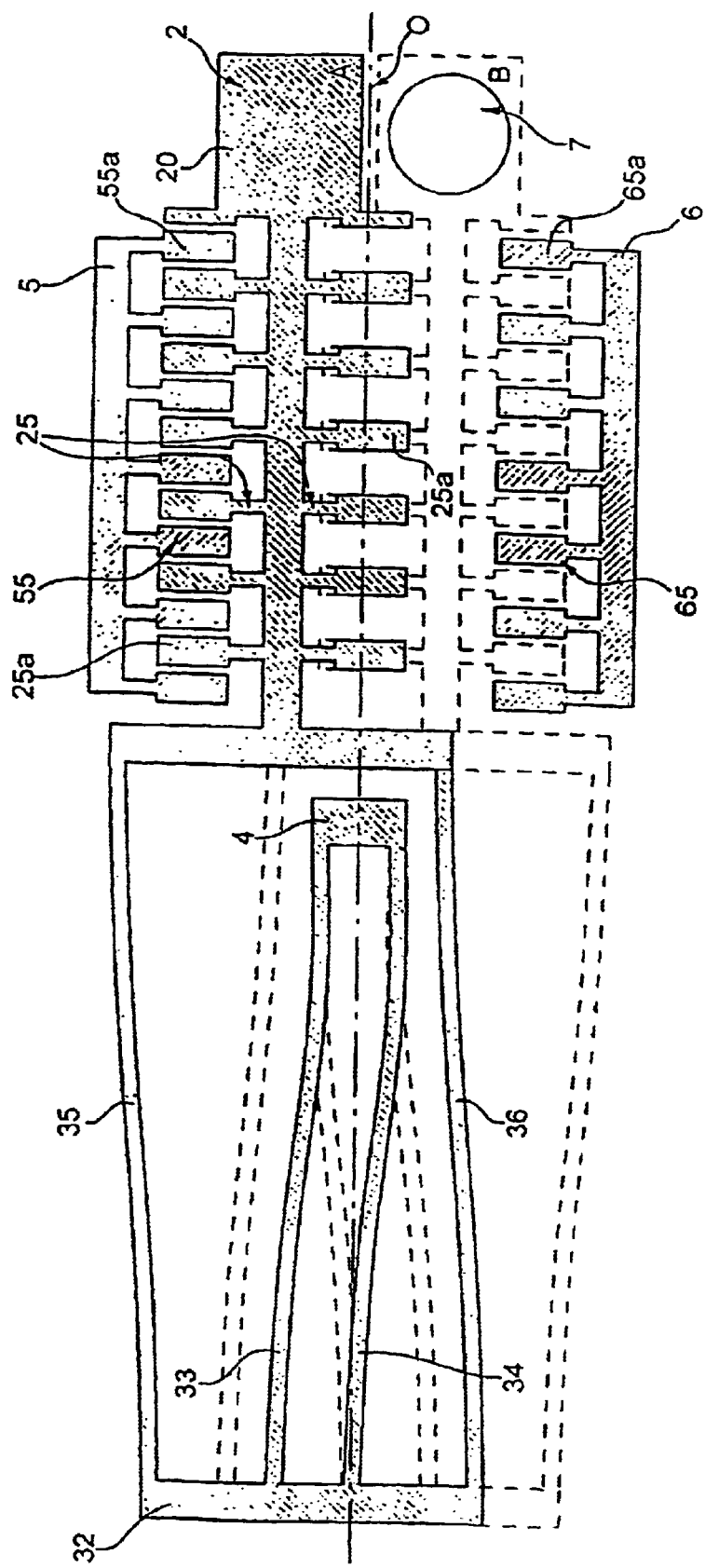
Figure 10B:
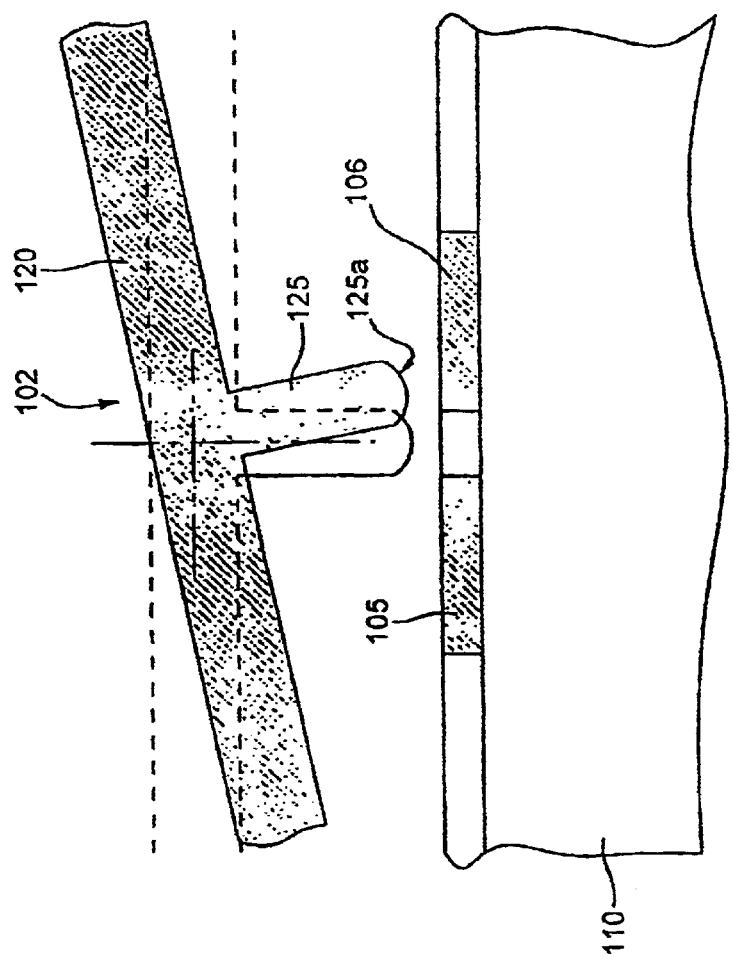
Figure 10A:
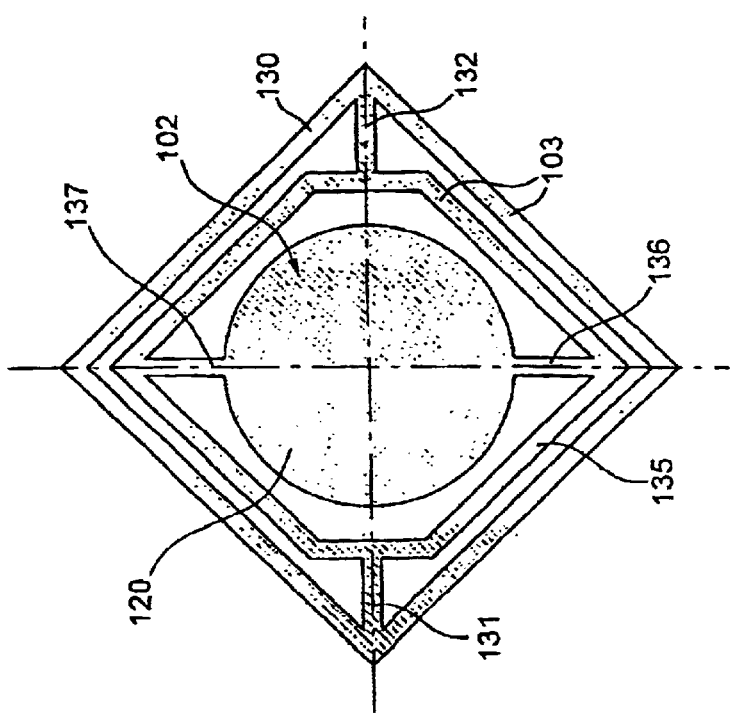
Figure 11:
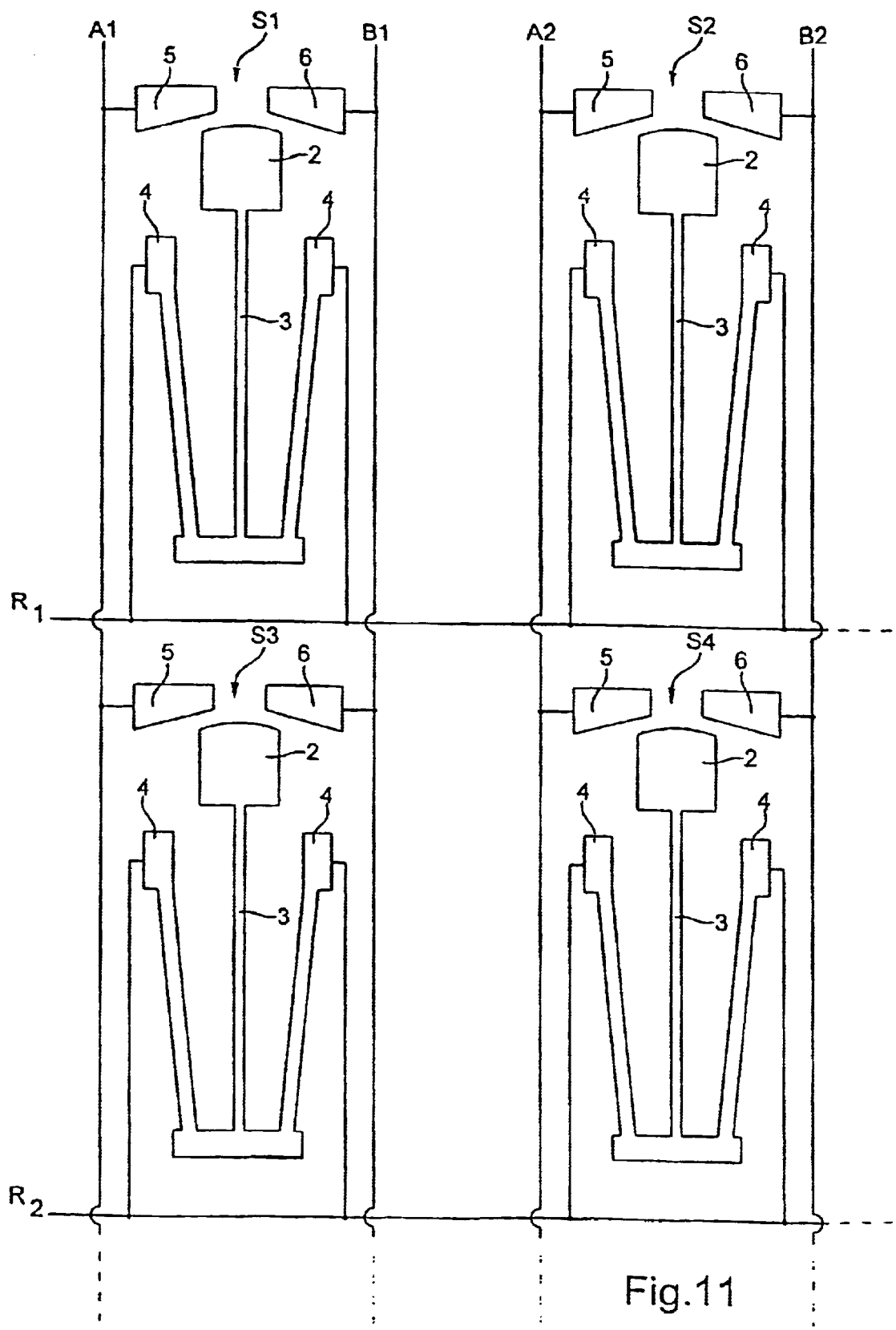
Figure 12:
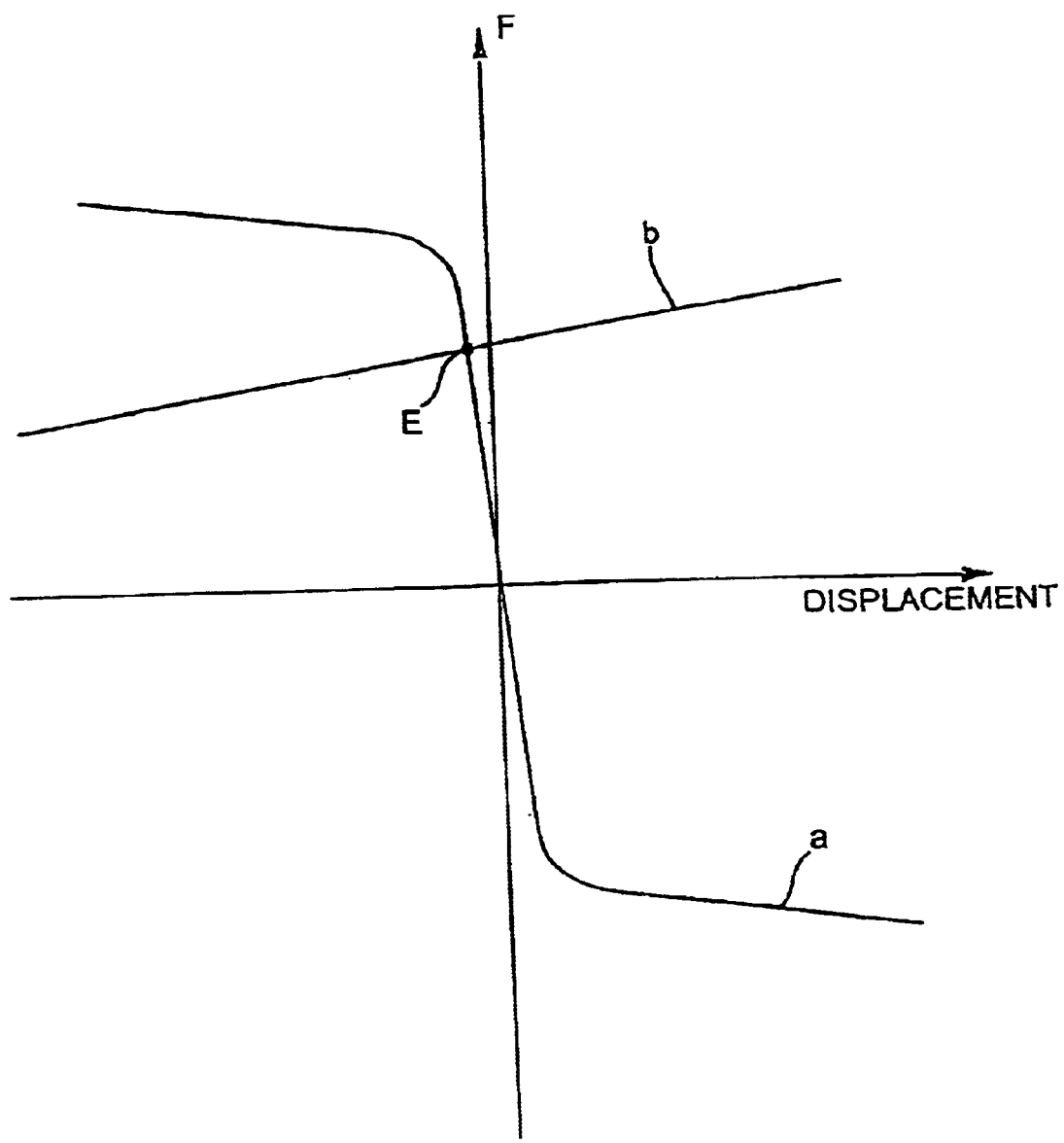
Figure 13:
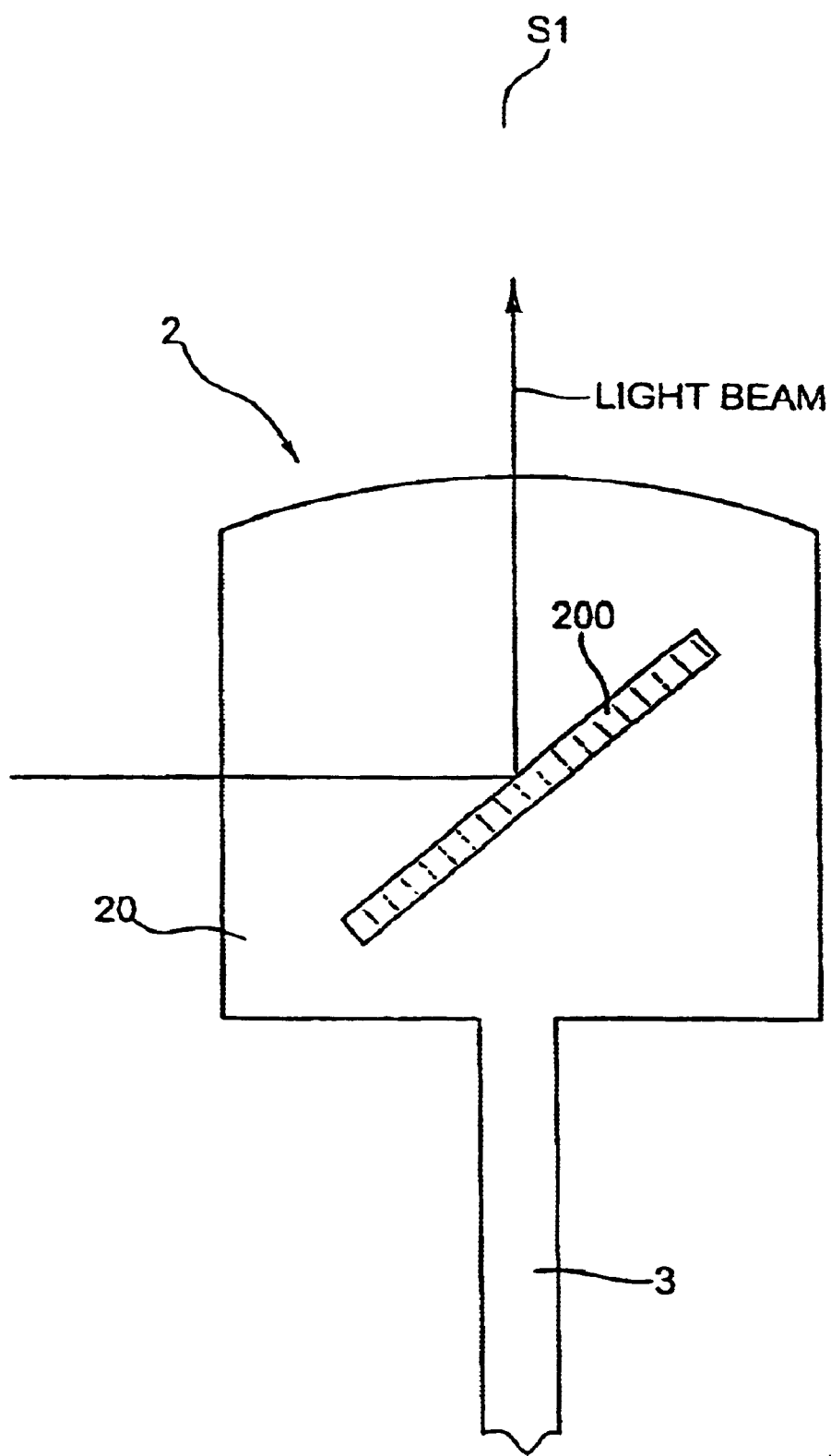
Figure 14:
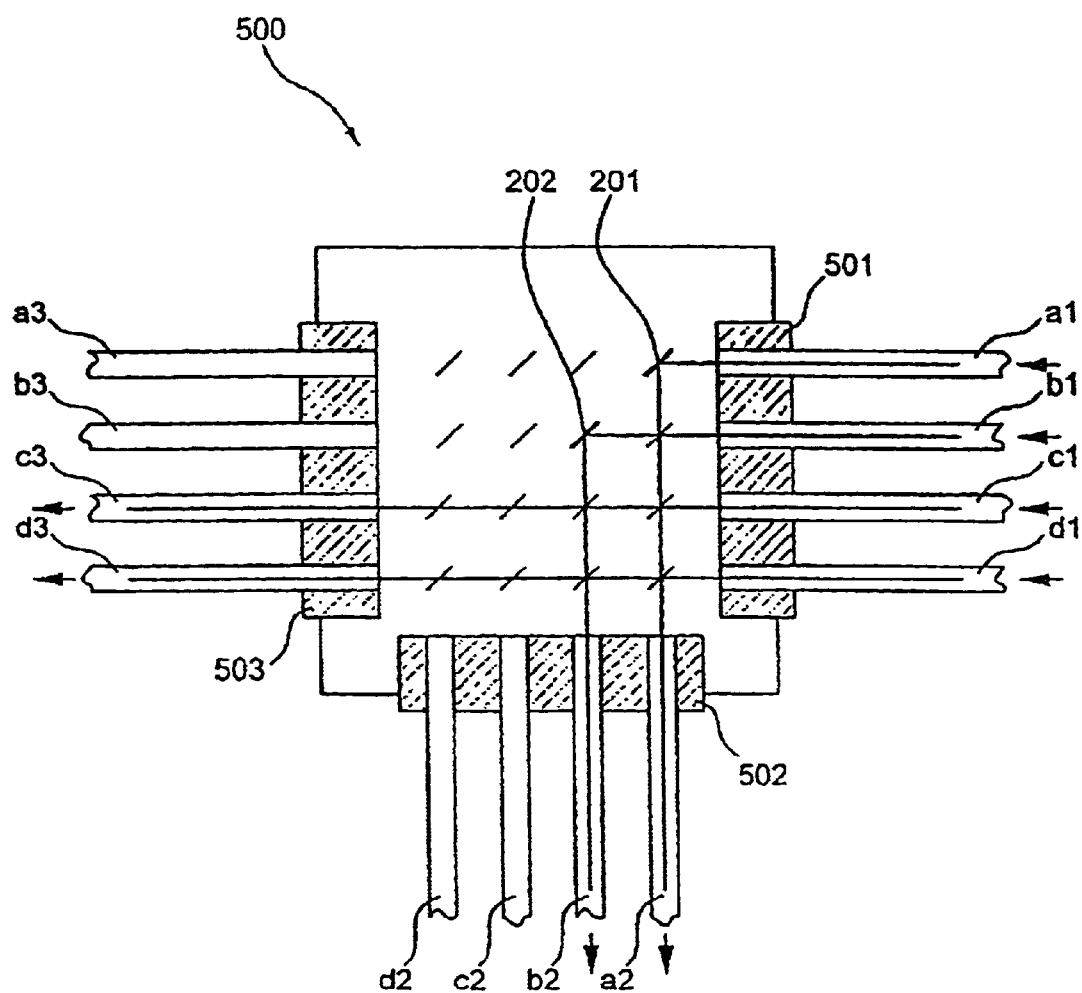

Other aspects, features and advantages of the present invention will be apparent upon reading the following detailed description of non-limiting examples and embodiments made with reference to the accompanying drawings, In which:

FIG. 1 schematically shows a first switching device of the prior art;

FIG. 2 schematically shows a known improvement of the switching device of FIG. 1;

FIG. 3 schematically shows a first embodiment of the switching device according to the present invention;

FIG. 4 schematically shows a second embodiment of the switching device according to the present invention;

FIG. 4a schematically shows a variant of the second embodiment of FIG. 3;

FIG. 5 schematically shows a parallel electrode configuration and the contribution of the attractive and lateral electrostatic forces;

FIG. 6 is a perspective view illustrating the out-of-plane deviation of the free-standing structure of FIG. 4a due to internal stress profile between the different layers of the structure and the proposed beam configuration for compensating for this deviation on the mobile element's side;

FIG. 7 schematically shows a third embodiment of the switching device according to the present invention;

FIG. 8 schematically shows a fourth embodiment of the switching device according to the present invention;

FIG. 9 schematically shows a fifth embodiment of the switching device according to the present invention comprising comb-shaped electrode structures;

FIGS. 10a and 10b are respectively a schematic top view and a partial side view of a sixth embodiment of the present invention in the form of a two-axis deformable or steerable mirror device;

FIG. 11 schematically shows a two-dimensional switching unit comprising an array of four switching devices similar to the switching device of FIG. 4a;

FIG. 12 schematically illustrates the evolution of the lateral electrostatic force and of the mechanical spring force exerted on the switching device's mobile element according to a preferred embodiment of the present invention;

FIG. 13 schematically illustrates a partial view of a switching device according to the present invention further carrying an optical deflecting screen plate disposed on the mobile element perpendicularly to the plane of movement of the switching device; and FIG. 14 schematically illustrates an optical switching device comprising an array of 4×4 switching devices as illustrated in FIG. 13.

FIG. 3 schematically shows a switching device constituting a first embodiment of the present invention. A mobile element 2 comprising a screen in the form of a plate 20 is attached to one end of an elastic rod or beam 3. The other end of the elastic beam 3 is clamped in an anchoring point or base 4.

As illustrated in FIG. 3, the elastic beam 3 extends, in a zero or rest position O, along an axis "x" indicated here for the purpose of explanation. Screen plate 20 and beam 3 form an oscillating mechanical system wherein screen plate 20 can move back and forth, here between two predetermined switching positions indicated by references A and B, along a direction substantially parallel to an axis "y" perpendicular to axis "x". It will be appreciated that only one or more than two predetermined switching positions could be defined. According to this embodiment, one will actually note that the screen plate's trajectory follows a curved path and is not strictly speaking parallel to axis y. One will however also note that the degree of curvature of the trajectory of screen plate 20 is dependent on the actual length of beam 3 and can thus be limited provided that the beam length is sufficiently high as compared to the global course of the mobile element. For the purpose of simplification, it will be held that the mobile element's trajectory is substantially parallel to axis y.

FIG. 4 schematically shows a second embodiment of the present invention. Again, the mobile element 2 comprising the screen plate 20 Is connected to two anchoring points or bases 4 by means of an elastic member. The elastic member here consists of a folded beam structure having, In this particular example, essentially an "E" shape. This folded beam structure comprises a first pair of beams 30 (a single beam could however be used) extending from base 4 to an intermediate member 32 in a direction substantially parallel to the plane of the substrate. A second beam 3 extends from intermediate member 32 to screen plate 20 in a second direction substantially opposite to the first direction. The geometry of the folded beam structure which elastically connects screen plate 20 to base 4 may take any other adequate form than that illustrated in FIG. 4. In particular, intermediate member 32 may be reduced in size so as to save some space on the substrate's surface, and first beams 30 may extend in a slightly oblique manner as shown in FIG. 4a. This latter configuration allows a higher density of switching devices to be accommodated on the same substrate.

As illustrated in FIG. 4, the elastic beams 3, 30 extend, in a zero or rest position O, along an axis "x" indicated here for the purpose of explanation. Screen plate 20, beams 3, 30 and intermediate member 32 form an oscillating mechanical system wherein screen plate 20 can move back and forth, here between two predetermined switching positions indicated by references A and B, along a direction substantially parallel to an axis "y", perpendicular to axis "x". It will again be appreciated that only one or more than two predetermined switching positions could be defined. According to this embodiment, the screen plate's trajectory also follows a curved path and is not strictly speaking parallel to axis y. One will however also note that the degree of curvature of the trajectory of screen plate 20 is dependent on the actual length of beam 3 and can thus be limited provided that the beam length is sufficiently high as compared to the global course of the mobile element. For the purpose of simplification, it will be held that the mobile element's trajectory is substantially parallel to axis y.

As shown in FIGS. 3 and 4, stationary actuating electrodes 5 and 6 for displacing screen plate 20 are respectively disposed in the vicinity of positions A and B. Actuating electrodes 5, 6 and screen plate 20, which is also covered by an electrode, are electrically connected to a control circuit 8 which can switch the switching device. Each one of electrodes 5, 6 comprises a so-called frontal edge 5a, 6a which cooperates with a frontal edge 20a of screen plate 20. In the rest position O, the frontal edge 20a of screen plate 20 may partially overlap the frontal edges of actuating electrodes 5, 6. As this will be appreciated hereinafter the control circuit 8 can conveniently be used for adjusting the switching position of the mobile element 2, for instance by varying the control voltage.

In the vicinity of actuating electrode 6, there is an opening 7 which is exposed when screen plate 20 is in end position A and which is covered when screen plate 20 is in end position B. In this way, a path for optical light beams can be opened or Interrupted so that the switching device acts as an optical shutter.

According to the above embodiments of the invention and in contrast to the prior art solutions, the electrodes are not disposed to act on the lateral edge of the screen plate 20 (that is an edge which is substantially perpendicular to the screen plate's trajectory) but act on the frontal edge 20a of screen plate 20, that is an edge which is substantially parallel to the screen plate's trajectory, or, in other words, an edge which extends along a direction substantially parallel to axis y in FIGS. 3 and 4. This driving principle may be called "Edge Electrostatic Drive", that is the movement of screen plate 20 is not caused by attractive forces generated by the actuating electrodes (as in the prior art solutions), but is rather caused by lateral forces which are substantially parallel to the cooperating edges of the stationary electrodes and of the electrode of the screen plate.

Expressions (1) and (2) hereinbelow are respectively simplified expressions of the attractive force $F_n$ and of the lateral force $F_t$, in the case of a parallel electrode configuration as illustrated in FIG. 5:

$$F_n = \frac{\varepsilon t R U^2}{2g^2} \quad (1)$$

$$F_t = \frac{\varepsilon t U^2}{2g} \quad (2)$$

where U is the voltage applied on the electrodes, R is the electrodes overlap, g the gap between the electrodes, t is the electrode thickness and $\varepsilon$ the dielectric constant. Expressions (1) and (2) show that the attractive force $F_n$ and lateral force $F_t$ are respectively proportional to and independent of the electrodes overlap R.

At constant electric field E, expressions (1) and (2) may be simplified as follows:

$$F_n = \frac{\varepsilon t R E^2}{2} \quad (3)$$

$$F_t = \frac{\varepsilon t E^2}{2} g \quad (4)$$

showing that the attractive force $F_n$ and lateral force $F_t$ are respectively independent and proportional to the gap g.

It may be demonstrated that lateral electrostatic forces exerted on two electrodes in a parallel configuration are proportional to the gap existing between these two electrodes.

According to the present invention, It will be noted that the switching device is auto-stabilized by saturation in the electrostatic drive, that is the structure does not require any stoppers to delimit the end positions of screen plate 20. This constitutes a considerable advantage with respect to prior art solutions since sticking of the structure against the stoppers as well as short-circuit or collapse of the structure against the actuating electrodes are thereby prevented. Stoppers may nevertheless be optionally provided in order to protect the structure against external shocks.

More particularly, the geometry of the mobile element, elastic member and stationary actuating electrodes is selected so that the mobile element cannot come into contact with either one of the actuating electrodes and that the predetermined switching positions are each defined by an equilibrium point between the lateral electrostatic forces produced on the mobile element by the stationary actuating electrodes and the mechanical springs forces produced by the elastic member. The force resulting from the sum of these lateral electrostatic forces and mechanical spring forces has opposite directions around this equilibrium point.

FIG. 12 schematically illustrates the evolution of the lateral electrostatic forces (curve a) and mechanical spring forces (curve b, which is a substantially linear curve) in the vicinity of the equilibrium point (indicated by reference E) according to a preferred embodiment of the invention. Preferably, the geometry of the mobile element, elastic member and stationary actuating electrodes is selected in such a way that the lateral electrostatic forces exhibit a steep drop of intensity close to the equilibrium point.

Assuming, for the purpose of explanation, that the mechanical spring forces can be neglected, it will be understood that each switching position of the device will be defined by the point of inversion of the lateral electrostatic forces. This point of inversion would coincide with a substantially symmetrical position of the mobile element with respect to the corresponding stationary actuating electrode.

Now, taking into account the effect of the mechanical spring forces produced by the elastic member and which tend to bring the mobile element back towards its zero position, each switching position will be defined by an equilibrium point (point E in FIG. 12) between the lateral electrostatic forces and mechanical spring forces (i.e. the intersection of curves a and b in FIG. 12). This equilibrium point E is closer to the zero position of the switching device than the point where inversion of the lateral electrostatic forces occurs.

Still referring to FIG. 12, It will be understood that if the geometry of the device as well as the driving voltages are adequately selected so that the equilibrium point which defines the switching position of the device is located on the steep drop of Intensity of the lateral electrostatic force, this equilibrium point will be substantially independent of manufacturing tolerances. Indeed, the mechanical springs force is largely dependent on the dimensions of the elastic member that connects the mobile element to the clamped base while the top portion of curve "a" illustrating the evolution of the value of the lateral electrostatic force depends strongly on the gap between the electrodes. However, the position of the steep drop of the lateral electrostatic force depends largely on the well controlled position of the actuating electrode. Therefore, the intersection of curves a and b of FIG. 12, which is the equilibrium point E defining the switching position of the mobile element, depends largely on the position of the steep drop of intensity of the lateral electrostatic force and only little on the elastic beam dimensions and on the absolute value of the electrostatic force (i.e. top flat part of curve a).

The above described property is also the basis that allows this structure to be used in a matrix configuration (as schematically illustrated in FIG. 11).

Furthermore, the attractive electrostatic forces which are still generated by the actuating electrodes produce a reaction on screen plate 20 which may be qualified as "lateral surfing". Indeed, the attractive electrostatic forces tend to attract screen plate 20 towards the actuated electrode. Since screen plate 20 is however retained by beam 3, plate 20 Is subjected to a torque which further pulls mobile element 2 to its selected position.

In the predetermined positions A, B, oscillation of screen plate 20 around its selected position is advantageously damped by air as well as electrostatically due to the inversion of the force resulting from the sum of the lateral electrostatic force and mechanical spring force exerted on screen plate 20. It must be stressed that this damping is achieved according to the present invention since screen plate is essentially moved due to contributions of lateral electrostatic forces and that such a damping effect could not be achieved with conventional systems based on attractive-type driving principles.

As briefly mentioned hereinabove, since the mobile element is essentially moved and held in place due to contributions of lateral electrostatic forces, its switching position can be adjusted by varying the control voltage applied to the electrodes. This possibility to adjust the switching position of the switching device through the applied control voltage is highly advantageous, in particular in optical applications where accuracy is a critical element. Indeed, it is now possible to effectively trim and adjust the device's effective switching position to correct positioning errors due to manufacturing tolerances and even recalibrate the device over time to compensate for drifting phenomena. In that regard. In an array of multiple switching devices, it would be advantageous to have individual electronic adjusting means for each one of the switching devices so as to be able to adjust each device's switching position individually.

Referring again to FIG. 4, frontal edge 20a of screen plate 20, that is the outermost edge of screen plate 20, is preferably designed to have a curved profile so that the gap between screen plate 20 and the electrodes 5, 6 can be reduced, thereby increasing the sensitivity of the device, and without fearing for short-circuits to happen between the actuating electrodes and the mobile element.

It will be appreciated that a decrease in the gap between the actuating electrodes 5, 6 and screen plate 20 increases the sensitivity of the switching device. In that regard, the drive sensitivity profile can easily be adjusted by an adequate choice of the electrode geometry. In FIG. 4 (as well as in FIG. 3), actuating electrodes 5, 6 are shown to have an oblique edge, but it will dearly be understood that these electrodes may exhibit any other suitable profile such as for instance a curved profile essentially matching the envelope of the screen plate axis extremity, or even a stepped profile.

The above switching device as well as the switching structures which will be described below are typically produced in a substrate (made of, for example, silicon or a transparent material such as glass) according to surface micro-machining techniques well-known in the art. For instance, the free-standing structures (such as screen plate 20, intermediate member 32 and beams 3, 30 in FIG. 4) may typically be fabricated using so-called sacrificial layer techniques, that is the movable structure of the switching device is firstly formed on top of a sacrificial layer or spacer and portions of this sacrificial layer are subsequently removed to release the required parts of the switching device.

Screen plate 20 is essentially square (having a surface area of approximately 35×35 $\mu m^2$ and a thickness of about 2 $\mu m$) and is attached to the end of beam 3 (having a length of about 350 to 400 $\mu m$ and a section of about 2.5×2 $\mu m^2$). Screen plate 20, intermediate member 32 and beams 3, 30 can be made, for example, of metal or polysilicon (or any other crystalline or polycrystalline material). Beams 3 and 30, being long and thin, are elastically deformable so as to allow a swinging movement of screen plate 20 In a plane substantially parallel to the substrate's plane.

The purpose of the folded beam structure schematically illustrated in the examples of FIGS. 4 and 4a is to compensate for the axial internal stress release and internal stress profile of the structure. FIG. 6 shows a perspective view of the switching device of FIG. 4a which illustrates this compensation mechanism. As shown in FIG. 6, the superposition of different layers of material on the free-standing structure of the switching device, in particular the superposition of polysilicon and metal layers, causes a deviation out of the substrate's plane (substrate is indicated by reference numeral 10) of the elastic folded beam structure. Since the first beams 30 and the second beam 3 extend in substantially opposite directions, the deviation on the intermediate member's side is essentially compensated on the screen plate's side.

FIG. 7 shows a third embodiment of the present invention. In this example, switching device 1 is provided with means for guiding screen plate 20 in a substantially linear way. To this end, the single beam structure of FIG. 3 is replaced by a parallel or pantograph-like structure. This parallel beam structure can easily be realized by means of a pair of parallel flexible beams indicated by reference numerals 35 and 36. Such a parallel configuration causes screen plate 20 to be guided linearly and not anymore rotated as this is the case with the above-described solutions. The frontal edge 20a of screen plate 20 does not therefore require to be curved and the gap between screen plate 20 and actuating electrodes 5, 6 can be kept almost constant.

The parallel structure which has just been described can also be combined with the folded beam structure of FIG. 4 as illustrated by the fourth embodiment of FIG. 8. The elastic member connecting screen plate 20 to the base 4 there comprises a first pair of parallel flexible beams 33, 34 extending from base 4 (there are actually two bases in this example) to intermediate member 32, and a second pair of parallel flexible beams 35, 36 extending from intermediate member 32 to screen plate 20 in an opposite direction. Here again, the gap between screen plate and actuating electrodes 5, 6 can be kept constant.

In the above examples, actuating electrodes 5, 6 cooperate with the frontal edge 20a of screen plate 20 (the outermost edge of screen plate 20). It will however be appreciated that the driving principle according to the present invention can be applied to any other suitable edge of mobile element 2 provided that this edge is substantially parallel to the mobile element's trajectory. For instance, mobile element 2 may advantageously be provided with one or more teeth that extend substantially perpendicularly from the axis of beam 3 and cooperate with an adequate electrode structure. Advantageously, the switching device may be equipped with comb-shaped electrode structures, that is two interpenetrating comb-shaped structures that cooperate together and which are provided, on the one hand, on mobile element 2 and, on the other hand, on actuating electrodes 5, 6.

FIG. 9 shows an example of the switching device according to the present Invention which is equipped with comb-shaped electrode structures, this device being essentially similar to the device of FIG. 8. Comb-shaped structures 25 are provided on each side of mobile element 2 and cooperate with comb-shaped structures 55 and 65 provided on actuating electrodes 5 and 6 respectively. Each tooth of comb-shaped structures 25, 55 and 65 extends in a direction substantially parallel to the mobile element's trajectory, and comprises an end portion 25a, 55a, 65a of greater dimensions or diameter than that of the portion which connects the tooth to mobile element 2 or actuating electrodes 5, 6, respectively. Accordingly, lateral electrostatic forces will also be produced by the actuating electrodes on each tooth of mobile element 2.

In the example of FIG. 9, the pair of parallel flexible beams 33, 34 which connect base 4 to intermediate member 32 are located between the second pair of parallel flexible beams 35, 36 that connect intermediate member 32 to mobile element 2. Base 4 can therefore advantageously act as a security stopper against external shocks.

An advantage of the switching device of FIG. 9 resides in the fact that high air damping of the structure can be achieved between the teeth of the comb-shaped structures. Associated with the electrostatic brake which is increased by the comb-shaped structures, this air damping contributes to reducing the setting time of the device.

Having described the present invention in connection with different embodiments of switching devices which all operate in a plane substantially parallel to the substrate's plane, it will be appreciated that the same operating principle could be applied to structures which are able to move or rotate out of the substrate's plane such as deformable mirror devices for instance.

Known deformable mirror structures can easily be adapted to use the above driving principle. For instance, referring to the embodiments disclosed in European Patent Application No. 0 510 629 which has already been mentioned, the deflectable element could be operated by providing actuating electrodes that cooperate with the lateral edges of the deflectable element. These deformable mirror devices could be of the torsion, flexural or cantilever type.

FIGS. 10a and 10b illustrate a particularly advantageous and simple example of a steerable mirror device operated according to the present invention. FIG. 10a is a top view of this steerable mirror device comprising a mobile element 102 including a screen plate 120 (which may typically comprise a reflective surface) connected to the substrate by an elastic member indicated globally by reference numeral 103. The elastic member 103 is designed to allow mobile element 102 to rotate around two perpendicular axes and comprises outer 130 and inner 135 frames. Outer frame 130 Is damped in an anchoring point or base (not shown) attached to the substrate and is connected to inner frame 135 by means of two torsion beams 131, 132 which define the first axis of rotation of mobile element 102. Inner frame 135 is connected to mobile element 102 by means of two torsion beams 136, 137 which define the second axis of rotation of mobile element 102.

FIG. 10b is a partial side view of the device of FIG. 9a which illustrates how the device is operated. Mobile element 102 comprises an actuating member 125 which extends substantially perpendicularly from screen plate 120 towards the substrate 110. A pair of actuating electrodes 105, 106 is provided underneath mobile element 102, on the substrate's surface, in the vicinity of the actuating members tip or extremity 125a. A second pair of similar actuating electrodes (not shown) is disposed along the other axis to allow deflection of the mobile element 102 around the other axis of rotation. Actuating member 125 is selectively moved from one side to the other In exactly the same way as this is the case with screen plate 20 In the embodiment of FIG. 4, lateral electrostatic forces being applied to the actuating member 125 by means of actuating electrodes 105, 106.

The switching device according to the present invention will preferably be used not individually but in combination with other identical devices to form an array. These switching devices may be arranged to form a regular two-dimensional grid, such as a rectangular or honeycombed arrangement, and are typically addressed using row and column lines. For the purpose of explanation, FIG. 11 schematically shows four switching devices S1 to S4 (similar to the switching device of FIG. 4a) which are arranged in two rows and two columns. The two actuating electrodes of switching devices S1 and S3 are connected together by two column lines A1 and B1, respectively. Similarly, the two actuating electrodes of switching devices S2 and S4 are connected together by two column lines A2 and B2. The bases of switching devices S1 and S2, on the one hand, and of switching devices S3 and S4, on the other hand, are connected together on a row line R1 and R2, respectively.

It will be understood that each switching device can be addressed individually by selectively activating the adequate row and column lines. It will also be appreciated that the specific arrangement of FIG. 11 is purely illustrative and is in no way limitative, and that the switching devices will in practice be organized in such way as to take as little space as possible to increase the density of such devices on the substrate.

FIG. 13 Is a partial top view of a switching device according to the present invention and showing the switching device's mobile element 2 and screen plate 20, and part of the elastic member 3 connecting this mobile element 2 to its damped base (not shown in this drawing). This switching device may be any one of the above described switching devices or, preferably, the one illustrated in FIG. 7. FIG. 13 further shows a deflecting screen plate 200 disposed on screen plate 20 perpendicularly to the plane of movement of the switching device (i.e. perpendicularly to the plane of the drawing). This deflecting screen plate 200 could be used to interrupt or deflect lights beams produced in a plane parallel to the plane of movement of the switching device.

FIG. 14 schematically illustrates an optical switching device 500 comprising an array of 4×4 switching devices (diagonal lines in the figure) as illustrated in FIG. 13. The switching device 500 comprises a first optical input 501 and two optical output 502, 503, each receiving four optical fibers a1 to d1, a2 to d2 and a3 to d3 respectively. Light beams applied on each one of the input fibers a1 to d1 may be selectively directed to either one of the two outputs 502, 503 by means of the switching device array. For the purpose of illustrations, two switching devices 201, 202 are shown to be actuated (shown in thick lines) to respectively deflect the light beams of input fibers a1, b1 to output fibers a2, b2. FIG. 14 also shows that the light beams of optical fibers c1 and d1 are not deflected and are transmitted to output fibers c3 and d3 respectively. It should be pointed out that, as mentioned above, it is particularly important to be able to adjust the position of the switching devices when actuated. Providing as many control circuits as switching devices would allows this to be done.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to structure comprising a mobile element able to be moved back and forth between only two end positions. Since no stoppers are anymore required, it could perfectly be envisaged to control the mobile element to switch between three or more predetermined positions provided that the device is equipped with the adequate number of electrodes.

What is claimed is:

1. A switching device comprising:
a mobile element that is able to move back and forth along a defined trajectory between a zero position and at least one predetermined switching position;
an elastic member connecting said mobile element to a base, said elastic member allowing said mobile element to at least move back and forth between said zero position and said at least one predetermined switching position; and
at least one stationary actuating electrode located in the vicinity of said at least one predetermined switching position for producing electrostatic forces to cause said mobile element to move to and/or away from said at least one predetermined switching position,
wherein said at least one stationary actuating electrode is disposed to act on at least one edge of said mobile element that is substantially parallel to the mobile element's trajectory,
and wherein the geometry of said mobile element, said elastic member and said at least one stationary actuating electrode is such that said mobile element cannot come into contact with said actuating electrode and that said at least one predetermined switching position is defined by an equilibrium point between lateral electrostatic forces produced on said mobile element by said at least one stationary actuating electrode and mechanical springs forces produced by said elastic member, the force resulting from the sum of said lateral electrostatic forces and said mechanical spring forces having opposite directions around said equilibrium point.

2. The switching device according to claim 1, wherein the geometry of said mobile element, said elastic member and said at least one stationary actuating electrode is such that said lateral electrostatic forces exhibit a steep drop of intensity close to said equilibrium point.

3. The switching device according to claim 1, wherein said device further comprises a control circuit for controlling the electrostatic forces produced by said actuating electrode and for adjusting the position of the mobile element near the equilibrium point.

4. The switching device according to claim 1, wherein said switching device is produced in the form of a micromechanical structure, said device further comprising a substrate, said mobile element, said elastic member and said actuating electrode being micro-machined into said substrate.

5. The switching device according to claim 4, wherein said substrate includes a crystalline or polycrystalline material such as silicon or polysilicon.

6. The switching device according to claim 4, wherein said substrate includes metal.

7. The switching device according to claim 4, wherein said mobile element comprises a screen plate which is able to move in a plane substantially parallel to the plane of said substrate.

8. The switching device according to claim 7, wherein an opening is provided in the plane of said substrate, said opening being either closed by said screen plate or open depending on whether said mobile element is in said predetermined switching position.

9. The switching device according to claim 7, wherein said elastic member comprises a folded beam structure comprising at least a first beam extending from said base to an intermediate member in a first direction substantially parallel to the plane of said substrate, and at least a second beam extending from said intermediate member to said mobile element in a second direction substantially opposite to said first direction.

10. The switching device according to claim 7, wherein said elastic member comprises a parallel or pantograph-like structure for guiding said mobile element so that its trajectory is substantially linear.

11. The switching device according to claim 10, wherein said parallel or pantograph-like structure comprises a first pair of parallel flexible beams extending from said base to an intermediate member in a first direction substantially parallel to the plane of said substrate, and a second pair of parallel flexible beams extending from said intermediate member to said mobile element in a second direction substantially opposite to said first direction.

12. The switching device according to claim 11, wherein said first pair of parallel flexible beams is located between said second pair of parallel flexible beams so that said base further forms a security stopper against external shocks.

13. The switching device according to claim 7, wherein said actuating electrode acts on an outermost edge of said mobile element, said outermost edge exhibiting a curved profile.

14. The switching device according to claim 7, wherein said mobile element and said actuating electrode each comprise a comb-shaped structure including a plurality of teeth extending in a direction substantially parallel to the mobile element's trajectory, each tooth comprising an end portion and a base portion connecting said end portion to said mobile element or said actuating electrode, respectively, said base portion being of smaller diameter than said end portion.

15. The switching device according to claim 14, wherein said comb-shaped structures are designed so that air damping between said teeth is achieved.

16. The switching device according to claim 7, wherein an optical deflecting screen plate is disposed on said screen plate perpendicularly to the plane of said mobile element for selectively deflecting a light beam parallel to said plane.

17. The switching device according to claim 4, wherein said mobile element comprises a screen plate which is substantially parallel, in a zero position, to the plane of said substrate, said screen plate being able to rotate around at least one axis of rotation substantially parallel to the plane of said substrate.

18. The switching device according to claim 17, wherein said mobile element comprises an actuating member extending substantially perpendicularly from said screen plate towards said substrate and at least one torsion beam extending along the direction of said at least one axis of rotation, said at least one actuating electrode being disposed on said substrate underneath said screen plate, in a direction substantially perpendicular to said at least one axis of rotation, so as to cause a displacement of said actuating member, and thereby rotation of said screen plate around said at least one axis of rotation.

19. The switching device according to claim 17, wherein said screen plate comprises a reflective surface.

20. A switching unit comprising a plurality of switching devices according to claim 1.

21. A method for actuating a switching device comprising:

a mobile element that is able to move back and forth along a defined trajectory between a zero position and at least one predetermined switching position;

an elastic member connecting said mobile element to a base, said elastic member allowing said mobile element to at least move back and forth between said zero position and said at least one predetermined switching position; and at least one stationary actuating electrode located in the vicinity of said at least one predetermined switching position for producing electrostatic forces to cause said mobile element to at least move to and/or away from said at least one predetermined switching position, said method comprising the steps of:

placing said stationary actuating electrodes to act on at least one edge of said mobile element which is substantially parallel to the mobile element's trajectory; and selecting the geometry of said mobile element, said elastic member and said at least one stationary actuating electrode so that said mobile element cannot come into contact with said actuating electrode and that said at least one predetermined switching position is defined by an equilibrium point between lateral electrostatic forces produced on said mobile element by said at least one stationary actuating electrode and mechanical springs forces produced by said elastic member, the force resulting from the sum of said lateral electrostatic forces and said mechanical spring forces having opposite directions around said equilibrium point.

* * * * *